United States Patent [19]

Delvaux et al.

[11] Patent Number: 5,250,588

[45] Date of Patent: Oct. 5, 1993

[54] ORGANIC FRICTION MATERIAL COMPOSITION FOR USE TO PRODUCE FRICTION LININGS

[75] Inventors: Pierre Delvaux, Bromptonville; Luc Desrosiers, Rock Forest; Alain Roy, Ascot Corner, all of Canada

[73] Assignee: Ceram SNA Inc., Sherbrooke, Canada

[21] Appl. No.: 465,979

[22] Filed: Jan. 16, 1990

[51] Int. Cl.⁵ .................... C08J 5/14; C08K 7/12

[52] U.S. Cl. .................... 523/159; 523/153; 524/452; 524/453; 524/454

[58] Field of Search ........... 524/452, 453, 454, 456; 523/153, 159

[56] References Cited

U.S. PATENT DOCUMENTS

| | | | |
|---|---|---|---|
| 2,360,645 | 12/1941 | Bruce et al. | 523/159 |
| 2,586,150 | 2/1952 | Cofek | 523/159 |
| 2,973,336 | 2/1961 | Delaplace et al. | 523/159 |
| 3,224,927 | 12/1965 | Brown et al. | 162/155 |
| 3,297,599 | 1/1967 | Eschen | 523/159 |
| 3,326,843 | 6/1967 | Barnett et al. | 523/159 |
| 3,353,975 | 11/1967 | Shannon et al. | 106/65 |
| 3,367,871 | 2/1968 | Mueller et al. | 252/62 |
| 3,444,071 | 7/1967 | Keller | 523/159 |
| 3,492,262 | 1/1970 | Griffith | 523/159 |
| 3,565,650 | 2/1971 | Cordon | 106/97 |
| 3,616,173 | 10/1971 | Green et al. | 161/162 |
| 3,661,603 | 5/1972 | Nicol | 106/90 |
| 3,682,667 | 8/1972 | Roberts et al. | 106/67 |
| 3,718,491 | 2/1973 | Yates | 106/84 |
| 3,809,566 | 5/1974 | Revord | 106/110 |
| 3,842,031 | 10/1974 | Lumb et al. | 523/159 |
| 3,933,515 | 1/1976 | Yang | 106/99 |
| 3,954,556 | 5/1976 | Jackson et al. | 162/145 |
| 3,974,024 | 8/1976 | Yano et al. | 162/101 |
| 4,101,335 | 7/1978 | Barrable | 106/99 |
| 4,107,376 | 8/1978 | Ishikawa | 428/306 |
| 4,111,891 | 9/1978 | Reynolds, Jr. | 523/159 |
| 4,119,591 | 10/1978 | Aldrich | 260/17.2 |
| 4,128,524 | 12/1978 | Barnett et al. | 260/39 R |
| 4,175,070 | 11/1979 | Klein et al. | 523/159 |
| 4,255,197 | 3/1981 | Peralta et al. | 106/41 |
| 4,274,881 | 6/1981 | Langton et al. | 106/98 |
| 4,277,596 | 7/1981 | Lalancette | 528/106 |
| 4,320,022 | 3/1982 | Aitcin | 252/62.59 |
| 4,363,738 | 12/1982 | Kummermehr | 252/62 |
| 4,414,031 | 11/1983 | Studinka et al. | 106/90 |
| 4,430,157 | 2/1984 | Lalancette | 162/145 |
| 4,461,643 | 7/1984 | Kaufman | 106/36 |
| 4,519,811 | 5/1985 | Lalancette et al. | 51/309 |
| 4,604,140 | 8/1986 | Lalancette et al. | 106/38.9 |
| 4,710,309 | 12/1987 | Miller | 252/62 |
| 4,722,866 | 2/1988 | Wilson et al. | 428/411.1 |
| 4,985,164 | 1/1991 | Delvaux et al. | 252/62 |

FOREIGN PATENT DOCUMENTS

| | | | |
|---|---|---|---|
| 1235149 | 4/1988 | Canada . | |
| 47728 | 3/1982 | European Pat. Off. . | |
| 49-074280 | 7/1974 | Japan . | |
| 57-160977 | 10/1982 | Japan . | |
| 57-205330 | 12/1982 | Japan . | |
| 0092332 | 5/1985 | Japan | 523/159 |
| 1066764 | 4/1986 | Japan | 524/456 |
| 1077653 | 4/1986 | Japan | 524/454 |
| 3225647 | 9/1988 | Japan | 524/456 |
| 3225649 | 9/1988 | Japan | 524/454 |
| 0837973 | 6/1981 | U.S.S.R. | 523/153 |
| 1172907 | 8/1985 | U.S.S.R. . | |
| 1083809 | 9/1967 | United Kingdom . | |

Primary Examiner—Paul R. Michl
Assistant Examiner—Peter Szekely
Attorney, Agent, or Firm—Foley & Lardner

[57] ABSTRACT

Disclosed is an organic friction material composition useful to produce any kind of friction linings, such as brake linings or clutch linings, that have to be capable of withstanding high operating temperatures and pressures for substantial periods of time. The composition comprises a thermosetting resin having heat resistant properties, and a fibrous-like synthetic forsterite obtained by calcination of chrysotile asbestos fibers at a temperature of from 650° C. to 1450° C., the synthetic forsterite having an MgO: SiO2 ratio lower than 1.1, a raw loose density of from 3 to 40 pounds per cubic foot, a thermal conductivity K factor of from 0.25 to 0.40 BTU. in/hr. °F.ft² and a fusion point of from 1600° to 1700° C., the weight ratio of resin to synthetic forsterite ranging from 0.25 to 0.70. The composition also comprises friction additives in such an amount as to adjust the friction and wear properties of the material to some predetermined values, and, if desired, other additives and fillers, with the proviso that the ratio of the total weight of all of these additives and fillers to the total weight of the composition is equal to or lower than 0.55.

11 Claims, No Drawings

ORGANIC FRICTION MATERIAL COMPOSITION FOR USE TO PRODUCE FRICTION LININGS

BACKGROUND OF THE INVENTION a) Field of the invention

The present invention relates to a new organic friction material composition useful to produce brake linings, clutch linings and, more generally, any kind of friction linings that must be capable of withstanding high operating temperatures and pressures for substantial periods of time.

The invention also relates to friction linings, including brake linings and clutch linings, obtained from such a composition, especially by wet or dry molding.

b) Brief description of the prior art

It is of common practice to use compositions containing organic or inorganic fibers dispersed in a thermosetting resin to produce friction linings and more particularly brake linings for use in cars, trucks, heavy duty machineries and the like. These compositions that are usually called "organic friction material compositions", may also contain friction additives such as cashew nut shell powder or oil, copper or brass particles, coal or coal derivatives, and the like, in such an amount as to adjust the friction and the properties of the material to some predetermined values. These compositions may further comprise other additives commonly used in any molding compositions, such as graphite which is known to be a molding lubricant. These compositions may further contain low-cost fillers such as baryte, calcium carbonate, chromite, iron oxide, natural or synthetic rubber, talc, wollastonite and similar materials, whose purpose is exclusively to reduce the amount of resin being used and thus the total cost of the linings made from such compositions. They may further contain natural organic fibers such as cellulose, synthetic organic fibers such as KEVLAR (trade mark), mineral fibers such as mineral wool or glass fibers, or metallic fibers such as steel fibers, for reinforcing purposes.

In practise, the friction linings that are obtained from the above mentioned compositions, may be classified in two broad categories, depending on the way they are produced.

The first category includes the friction linings obtained by impregnation of a fabric made of woven fibers. According to this process, a fabric made of woven asbestos fibers is reinforced by a wire of brass or copper and is impregnated with a thermosetting resin of the china oil or linseed oil type, that is subsequently polymerized. Use can also be made of sodium silicate instead of the resin.

The friction linings that are so-produced are often used in brakes or clutches in which the linings are immersed into a liquid, such as oil (wet applications). Examples of such applications are into public transportation vehicles, military vehicles, industrial vehicles or farm equipments.

The other category includes all the friction linings that are obtained by dry or wet molding.

Usually, the compositions used for the manufacture of friction linings by dry molding comprises the following four major components:

1- a thermosetting resin which is usually a dry resin of the phenolic type;
2- reinforcing fibers which usually consist of chrysotile asbestos;
3- friction additives suitably selected to provide the requested friction properties; and
4- low-cost fillers to reduce the total cost of the linings.

The dry-molding process comprises the following steps.

1- Dry mixing of all the components in a mixer until a good homogeneity and an adequate bulk density are achieved.
2- Cold pressure molding of the mixture into preformed shapes to further reduce the bulk density of the mixture. Such preforms must have some preselected characteristics of hardness, firmness and flexural strength to pass through the subsequent steps.
3- Hot molding and final curing. The preforms are introduced into a mold and compressed to a pressure of about 2000 psi at a temperature of 125° to 135° C. for a period of time of about 4 minutes. The final curing is carried out in an oven for about 2 hours at 125° C.

To be properly molded, any composition must have good flow properties; it must not lead to the formation of blisters and not stick to the wall of the mold. All of these properties allow for proper qualification of a composition according to its ability to be molded or manufactured industrially. Such properties however are not sufficient to determine whether the composition will result in linings having good mechanical properties and sufficient friction properties, such properties also depending on the relative amount of the basic components of the composition.

Friction linings produced by dry-molding as disclosed hereinabove are often used as disc pad brake linings for typical application in cars, or as block brake linings.

The composition that are used for the manufacture of friction linings by wet-molding comprises the same four major components as disclosed hereinabove, except for the thermosetting resin which is liquid and may be used with or without solvent.

The wet molding process used to produce friction linings from such liquid composition consists in mixing the components in a mixer such as a SIGMA ® mixer, then forming the mixture into a calendering machine comprising two rollers and subjecting the so-formed mixture to hot-polymerization under pressure.

Friction linings produced by wet-molding are generally used as roll brake linings in passenger cars.

In the past, the fiber that has widely been used to prepare organic friction material compositions whatever be their "categories" is asbestos, because of its very low cost and its ability to provide friction linings having good durability and good friction and strength properties.

Over the last decade, other fibers have been proposed as substitutes for asbestos to manufacture organic friction material compositions. Examples of such "alternative" compositions are disclosed by way of examples in U.S. Pat. No. 4,119,591 and No. 4,461,643, and in the other prior art references that are mentioned in the preamble of these two patents.

U.S. patent application Ser. No. 246,198 filed on Nov. 8, 1988 in the name of the same Applicant, discloses and claims a fibrous-like synthetic forsterite product which is particularly useful as an insulating material. This product which is presently offered for sale under the trademark FRITMAG and will be called as such hereinafter, is obtained by subjecting chrysotile asbestos fibers of any commercial grade, having an MgO: SiO2 ratio lower than 1:1, to calcination at a temperature of from 650° to 1450° C.

FRITMAG has a raw loose density of from 3 to 40 pounds per cubic foot, a thermal conductivity K factor of from 0.25 to 0.40 BTU. in/hr. °F.ft$^2$ and a fusion point of about 1600° to 1700° C. It possesses a somewhat fibrous structure resembling that of the chrysotile asbestos fibers from which it derives, although this fibrous structure has shown to disappear upon rough manipulation, when subjected to pressure, or when mixed with other material. Then, the fibrous structure is lost but the product has and always retains a high insulating value which is quite superior to granular forsterite, or similar to KAOWOOL (trademark) or rockwool.

In the above-mentioned U.S. patent application, it is mentioned that FRITMAG may be used as a substitute for asbestos, whenever a fibrous material to be used in bulk and having high insulating qualities is needed. Indeed, FRITMAG has a loose density range substantially identical to asbestos. It also has high insulating properties and is devoided of all the undesirable health problems allegedly attributed to asbestos. In particular, the above-mentioned U.S. patent application suggests to mix FRITMAG with an inert filler and a binder in order to form an insulating composition adapted to be shooted onto any surface to be insulated or to be moulded in the form of slabs for roof insulation. However, no specific example of such a composition is given, and no other use is suggested, except for a very short reference made in the specification to the possibility of mixing FRITMAG with other materials, such as Portland cement.

SUMMARY OF THE INVENTION

In accordance with the present invention, it has surprisingly been found that friction linings that have very good wear and friction properties and are capable of withstanding very high temperatures and pressures for substantial periods of time, can be produced from organic friction material compositions of the above mentioned type, containing FRITMAG as a substitute for asbestos.

More particularly, it has surprisingly been found that the change of structure that has been noticed in FRITMAG when the same is subject to pressure or mixed with other materials does not affect the properties of friction linings produced from such a composition, even when the same is processed by a dry-or wet-molding process.

More particularly, the present invention proposes an organic friction material composition comprising:

a) FRITMAG as a substitute for asbestos;

b) a thermosetting resin having heat resistant properties;

c) at least one friction additive present in such an amount as to adjust the friction and wear properties of the material to some predetermined values; and, if desired d) at least one other additive or filler.

In accordance with the invention, it has also been found that the above composition to be efficient, must have a weight ratio of resin to FRITMAG ranging between 0.25 and 0.70, and preferably between 0.50 and 0.60.

In accordance with the invention, it has further been found that the ratio of the total weight of all the additive(s) and/or filler(s) present in the composition to the total weight of this composition must be equal to or lower than 0.55. Indeed, it has been found that if this ratio exceeds 0.55, the resulting friction linings may lack some essential properties and thus become unuseful.

The organic friction material composition according to the invention may contain any kind of friction additives, other additives and/or fillers commonly used in the art, like those mentioned in the preamble of the present disclosure.

The organic friction material composition according to the invention may also contain any kind of thermosetting resin having heat resistance properties, that are presently used in the art. By way of example, such thermosetting resins may be selected from the group consisting of phenol-formaldehyde resins, resorcinol-formaldehyde resins, epoxy resins and mixtures thereof. Such resins can be dry or wet. For dry molding application, use is preferably made of a dry resin of the phenolic type. For wet molding application, use is preferably made of a liquid resin of the thermosetting type like linseed oil.

The invention and its advantages will be better understood upon reading the following, non-restrictive examples.

COMPARISON EXAMPLE

Manufacture of a chrysotile asbestos-containing lining by dry molding and evaluation of mechanical and friction properties of the so manufactured lining

I- FORMULATION

A typical formulation for the manufacture of a dry asbestos organic lining is as follows (the given percentages being expressed by weight).

TABLE 1

| | |
|---|---|
| phenolic resin | 17.0% |
| chrysotile asbestos | 52.0% |
| friction additives and fillers | 31.0% |

In the present case, use was made of the following products:

| | |
|---|---|
| 1-phenolic resin: | phenolic resin no. 7716 sold by BTL Specialty Resin Canada, a divison of Bakelite Thermosets ltd; |
| 2-chrysotile asbestos: | asbestos fibers of grade 7R-410 (according to ASTM D3639); |
| 3-additives and fillers: | these that were used in the above formulation are quite typical and contain the following components (the percentage being also expressed by weight). |

TABLE II

| | |
|---|---|
| Cashew shell oil | 21.0% |
| Coal | 9.7% |
| Graphite | 11.3% |
| Calcium carbonate | 29.0% |
| Baryte | 29.0% |
| | 100.0% |

As cashew shell oil, use was made of the oil sold under the trade name NC 104-30 by Cardolite Corp., N.J..

As coal, use was made of the anthracite fines #7 sold by Hickman Williams Co., Montreal.

As graphite, use was made of the graphite no. 8020 sold by Asbury Graphite Mills Inc., N.J.

As calcium carbonate, use was made of the product sold under the trade name STL 690 by St-Lawrence Chemical.

As baryte, use was made of the product sold under the trade name W-125 by Mountain Mineral of Lethbridge (Alberta) and distributed by L. V. Lomas Chemical Cie Ltd.

II- PROCESSING

All the above mentioned components in requested amounts to produce a 2 kg composition for use to manufacture brake linings were introduced into a concrete mixer. The kinds and percentages of components used in the formulation were as disclosed hereinabove and reported in Tables I and II.

The mixture was homogenized for about 4 minutes and 250 g of the homogenized mixture were introduced into a preforming mold (4"×4") and subjected therein to a pressure of 2500 psi for 15 seconds.

Some of the characteristics of the preforms that were so-obtained, were measured or otherwise determined, including:

mold ejectability;
easiness to remove the preform from the mold;
firmness;
resistance of the preform to subsequent handling and processing;
hardness "B" scale;
flexural strength;
bulk factor; and
apparent density.

The preforms that were so obtained were removed from their preforming molds and placed in other molds of identical dimension (4"×4"), for final molding.

During this final molding, the preforms were first cured for 1 minute at 125°-130° C. without any pressure applied thereto. Then, compression was started and a pressure of 2000 psi was applied for 3 minutes at a temperature of 125°-135° C. Degazification of the compressed mixture was carried as is known in the art. After extraction from the mold, the samples were cured in an oven for about 2 hours at 125° C.

Some of the characteristics of the molded samples that were so obtained were measured or otherwise determined, including:

sticking to the wall of the mold;
blister formation during molding;
density;
water absorption;
flexural strength;
shear strength; and
flow and eventually overflow out of the mold.

All of the above mentioned measurements or determination were carried out according to the following standards:

| Performing | |
|---|---|
| Hardness B scale | REX (according to ASTM 2240) |
| Bulk factor | ASTM 1895-C |
| Apparent Density | ASTM 1895-C |
| Flexural Strenght | ASTM D-790 |
| Preformability | estimation |
| Ejectability | estimation |
| Moldability | |
| Sticking | estimation |
| Blister | estimation |

| -continued | |
|---|---|
| Density | ASTM D-792 |
| Water absorption | D-570 |
| Flexural strength | ASTM D-790 |
| Shear strength | D3846 |
| Flow | estimation |

For all the data that were not measured but merely estimated, the following classification was adopted:

A—excellent
B—good
C—fair
D—weak
E—fail.

All of these characteristics as they were measured on linings obtained from the prior art formulation given hereinabove are reported in TABLE III, below:

TABLE III

Characteristics of the preforming material and the mechanical properties of the asbestos organic lining as reference.

| COMPOSITION AND PROPERTIES | RATIO (I/II) 0.33 |
|---|---|
| 1. COMPOSITION | |
| I) Resin | 17.0 |
| II) Asbestos | 52.0 |
| III) Filler | 31.0 |
| 2. PREFORMING | |
| Ejectability | B |
| Firmness | A |
| Hardness "B" scale | 73 |
| Bulk factor | 4.0 |
| Apparent density (g/cc) | 0.49 |
| Flexural strenght (psi) | 68 |
| 3. MOLDABILITY | |
| Sticking | A |
| Blister | A |
| Density (g/cc) | 1.98 |
| Water absorption (%) | 0.36 |
| Flexural strenght (psi) | 8900 |
| Shear strenght (psi) | 3650 |
| Flow | B |

III- FRICTION PROPERTIES

It is of common practise for the brake system equipment manufacturers to evaluate the friction material performance by measuring or otherwise determining the following characteristics:

fade resistance;
fade recovery;
delayed fade;
effectiveness versus speed;
friction stability;
wet friction;
moisture sensitivity; and
wear rate.

In the present case, these characteristics were measured on the asbestos-containing friction linings obtained as disclosed hereinabove according to the LINK-CHASE test no. SAE J661 a, and the data that were so obtained are reported in TABLE IV.

The letter code of the coefficient of friction according to SAE J661 a, is:

E, over 0.25 but not over 0.35
F, over 0.35 but not over 0.45.

TABLE IV

LINK-CHASE SAE J-661 FRICTION MATERIAL TEST REPORT ASBESTOS FORMULATION

| TEST | FRICTION COEFFICIENT |
| --- | --- |
| INITIAL BASELINE | |
| APPLICATION 1 | 0.328 |
| 20 | 0.305 |
| FIRST FADE | |
| °F. 200 | 0.300 |
| 550 | 0.359 |
| FIRST RECOVERY | |
| °F. 500 | 0.326 |
| 200 | 0.266 |
| WEAR | |
| APPLICATION 1 | 0.339 |
| 100 | 0.393 |
| SECOND FADE | |
| °F. 200 | 0.252 |
| 650 | 0.378 |
| SECOND RECOVERY | |
| °F. 600 | 0.366 |
| 200 | 0.269 |
| FINAL BASELINE | |
| APPLICATION 1 | 0.267 |
| 20 | 0.308 |
| NORMAL COEFFICIENT | 0.316(E) |
| HOT FRICTION COEFFICIENT | 0.354(F) |
| WEAR | |
| WEIGHT LOSS % | 10.8 |
| THICKNESS LOSS % | 8.7 |

EXAMPLE 1

Using the same kind of resin and the same kinds and relative concentrations of additives and fillers as disclosed in the comparison example, five different formulations were prepared and processed as disclosed hereinabove, using FRITMAG instead of asbestos as fibers.

In these five formulations, the weight percentage of additives and fillers was kept constant (31%). As a result, the weight percentage of resin plus FRITMAG remained also constant (69%).

However, the ratio of resin to FRITMAG was varied to be equal to 0.25, 0.35, 0.50, 0.60 and 0.80 for formulation nos. 1 to 5, respectively.

The preforming and mechanical properties of the resulting products are given in TABLE V below:

TABLE V

Characteristics of the preforming material and the mechanical properties of the example 1.

| COMPOSITION AND PROPERTIES | No FORMULATION | | | | |
| --- | --- | --- | --- | --- | --- |
| | 1 | 2 | 3 | 4 | 5 |
| | RATIO (I/II) | | | | |
| | 0.25 | 0.35 | 0.50 | 0.60 | 0.80 |
| 1. COMPOSITION | | | | | |
| I) Resin (%) | 13.8 | 17.9 | 23.0 | 25.9 | 30.7 |
| II) Fritmag (%) | 55.2 | 51.1 | 46.0 | 43.1 | 38.3 |
| III) Filler (%) | 31.0 | 31.0 | 31.0 | 31.0 | 31.0 |
| 2. PREFORMING | | | | | |
| Ejectability | B | B | B | B | B |
| Firmness | C | C | B | B | B |
| Hardness "B" scale | 47 | 55 | 60 | 65 | 70 |
| Bulk factor | 3.4 | 3.4 | 3.6 | 3.4 | — |
| Apparent density (g/cc) | 0.52 | 0.54 | 0.56 | 0.58 | 0.59 |
| Flexural strenght (psi) | 10.4 | 15.8 | 21.0 | 21.0 | 36.1 |
| 3. MOLDABILITY | | | | | |
| Sticking | A | A | A | A | E |
| Blister | A | A | A | A | E |
| Flow | B | B | A | A | E |
| Density (g/cc) | 1.79 | 1.86 | 1.99 | 1.95 | — |
| Water absorption (%) | 3.06 | 1.14 | 0.24 | 0.17 | — |
| Flexural strenght (psi) | 5600 | 7750 | 8250 | 8050 | — |
| Shear strenght (psi) | 3300 | 4850 | 8800 | 7100 | — |

As can be noted, formulations 3 and 4 have the best preforming properties inasmuch as the firmness, the ejectability and flow were respectively given as "good" (B), "good" (B) and "excellent" (A). These properties may easily be compared to those obtained with the comparison product made from asbestos, where the same properties respectively given as "excellent" (A), "good" (B) and "good" (B) (see TABLE III).

Similarly, the flexural strengths of formulations 3 and 4 were equal to 8250 and 8050 psi respectively, as compared to 8900 psi for the asbestos containing product; the shear strengths of formulations 3 and 4 were 8800 and 7100 psi respectively, as compared to 3650 psi for the asbestos containing product.

As can also be noted, the properties of formulations 1 and 2 may also generally be classified as good, except for the firmness that is given as "fair" (C) only.

Formulation 5 where the ratio of resin to FRITMAG was well over 0.60 was very difficult to mold in the same operating conditions. Thus, it becomes obvious that high ratios of resin to FRITMAG must be avoided.

The friction characteristics of the resulting linings measured according to the SAE J661 test are reported in TABLE VI below:

TABLE VI

LINK-CHASE SAE J-661 FRICTION MATERIAL TEST REPORT FRITMAG FORMULATION (Example 1)

| TEST | FRICTION COEFFICIENT No FORMULATION | | | |
| --- | --- | --- | --- | --- |
| | 1 | 2 | 3 | 4 |
| INITIAL BASELINE | | | | |
| APPLICATION 1 | 0.461 | 0.387 | 0.321 | 0.319 |
| 20 | 0.474 | 0.441 | 0.326 | 0.364 |
| FIRST FADE | | | | |
| °F. 200 | 0.471 | 0.439 | 0.332 | 0.350 |
| 550 | 0.384 | 0.431 | 0.362 | 0.385 |
| FIRST RECOVERY | | | | |
| °F. 500 | 0.405 | 0.414 | 0.344 | 0.374 |
| 200 | 0.422 | 0.420 | 0.340 | 0.330 |
| WEAR | | | | |
| APPLICATION 1 | 0.421 | 0.405 | 0.350 | 0.390 |
| 100 | 0.434 | 0.450 | 0.421 | 0.409 |
| SECOND FADE | | | | |
| °F. 200 | 0.420 | 0.442 | 0.407 | 0.269 |

TABLE VI-continued

LINK-CHASE SAE J-661 FRICTION MATERIAL
TEST REPORT FRITMAG FORMULATION (Example 1)

| TEST | FRICTION COEFFICIENT No FORMULATION | | | |
|---|---|---|---|---|
| | 1 | 2 | 3 | 4 |
| 650 | 0.418 | 0.447 | 0.376 | 0.416 |
| SECOND RECOVERY | | | | |
| °F. 600 | 0.427 | 0.444 | 0.378 | 0.362 |
| 200 | 0.427 | 0.400 | 0.408 | 0.295 |
| FINAL BASELINE | | | | |
| APPLICATION 1 | 0.421 | 0.396 | 0.396 | 0.310 |
| 20 | 0.437 | 0.404 | 0.393 | 0.362 |
| NORMAL COEFFICIENT | 0.411(F) | 0.432(F) | 0.416(F) | 0.346(E) |
| HOT FRICTION COEFFICIENT | 0.423(F) | 0.432(F) | 0.389(F) | 0.370(F) |
| WEAR | | | | |
| WEIGHT LOSS % | 31.3 | 20.9 | 8.5 | 5.9 |
| THICKNESS LOSS % | 26.1 | 20.0 | 5.0 | 4.1 |

As can be noted, formulation 3 had good frictional value F-F, acceptable wear rates, and good stable friction throughout the test program; formulation 4 also had good frictional value E-F, good wear rate and relatively good stable friction throughout the test program; formulations 1 and 2 both had good frictional value of F-F and relatively good stable friction throughout the test program. However, both of them also had a high wear rate.

By way of comparison, the asbestos-containing formulation used as a reference showed good frictional value E-F, good wear rate and relatively good stable friction throughout the test program.

EXAMPLE 2

Using the same kind of resin and the same kinds and relative concentrations of additives and fillers as disclosed in the comparison example, four other formulations were prepared and processed as previously explained, using FRITMAG instead of asbestos as fibers.

In the formulations numbered 6 and 7 respectively, the ratios of resin to FRITMAG were equal to 0.50 and 0.60 respectively. The percentage of additives and fillers was however increased up to 45% in both cases. In the other formulations numbered 8 and 9 respectively, the ratios of resin to FRITMAG were equal to 0.50 and 0.60 respectively but the percentage of additives and fillers was lowered to 25% in both cases.

The preforming and mechanical properties of the resulting products are given in TABLE VII below:

TABLE VII

Characteristics of the preforming material and the mechanical properties of the example 2.

| COMPOSITION AND PROPERTIES | No FORMULATION | | | |
|---|---|---|---|---|
| | 6 | 7 | 8 | 9 |
| | RATIO (I/II) | | | |
| | 0.50 | 0.60 | 0.50 | 0.60 |
| 1. COMPOSITION | | | | |
| I) Resin (%) | 18.4 | 20.6 | 25.0 | 28.1 |
| II) Fritmag (%) | 36.6 | 34.4 | 50.0 | 46.9 |
| III) Filler (%) | 45.0 | 45.0 | 25.0 | 25.0 |
| 2. PREFORMING | | | | |
| Ejectability | B | B | B | B |
| Firmness | C | C | B | B |
| Hardness "B" scale | 55 | 56 | 67 | 68 |
| Bulk factor | 3.3 | 3.2 | 3.7 | 3.5 |
| Apparent density (g/cc) | 0.59 | 0.61 | 0.54 | 0.55 |
| Flexural strenght (psi) | 9.0 | 4.8 | 19.2 | 29.9 |
| 3. MOLDABILITY | | | | |
| Sticking | A | A | A | A |
| Blister | A | A | A | A |
| Flow | B | B | B | B |
| Density (g/cc) | 1.95 | 1.98 | 2.00 | 1.95 |
| Water absorption (%) | 0.37 | 0.18 | 0.15 | 0.14 |
| Flexural strenght (psi) | 6625 | 7400 | 10200 | 9900 |
| Shear strenght (psi) | 5625 | 7570 | 9290 | 9400 |

As can be noted, formulation nos 8 and 9 had the best preforming properties inasmuch as the firmness, ejectability and flow were all given as "good" (B). The flexural strengths of formulation nos 8 and 9 were equal to 10200 and 9900 psi respectively, whereas their shear strengths were equal to 9290 and 9400 psi, respectively.

Formulation nos 6 and 7 containing more additives and fillers than the others have shown less interesting properties. Their firmness was given as "fair" (C) and their ejectability and flow were both given as "good" (B). Their flexural strengths were equal to 6625 and 7400 psi, respectively, and their shear strengths were equal to 5625 and 7570 psi.

The friction characteristics of the resulting linings were measured as explained hereinabove and are reported in TABLE VIII below:

TABLE VII

LINK-CHASE SAE J-661 FRICTION MATERIAL
TEST REPORT FRITMAG FORMULATION (Example 2)

| TEST | FRICTION COEFFICIENT No FORMULATION | | | |
|---|---|---|---|---|
| | 6 | 7 | 8 | 9 |
| INITIAL BASELINE | | | | |
| APPLICATION 1 | 0.450 | 0.381 | 0.414 | 0.439 |
| 20 | 0.478 | 0.417 | 0.458 | 0.439 |

TABLE VII-continued

LINK-CHASE SAE J-661 FRICTION MATERIAL
TEST REPORT FRITMAG FORMULATION (Example 2)

| TEST | FRICTION COEFFICIENT No FORMULATION | | | |
|---|---|---|---|---|
|  | 6 | 7 | 8 | 9 |
| FIRST FADE | | | | |
| °F. 200 | 0.484 | 0.404 | 0.477 | 0.460 |
| 550 | 0.419 | 0.405 | 0.479 | 0.417 |
| FIRST RECOVERY | | | | |
| °F. 500 | 0.480 | 0.447 | 0.521 | 0.471 |
| 200 | 0.410 | 0.380 | 0.461 | 0.378 |
| WEAR | | | | |
| APPLICATION 1 | 0.442 | 0.457 | 0.434 | 0.443 |
| 100 | 0.355 | 0.369 | 0.411 | 0.401 |
| SECOND FADE | | | | |
| °F. 200 | 0.353 | 0.337 | 0.344 | 0.341 |
| 650 | 0.389 | 0.442 | 0.430 | 0.406 |
| SECOND RECOVERY | | | | |
| °F. 600 | 0.370 | 0.417 | 0.417 | 0.416 |
| 200 | 0.389 | 0.363 | 0.480 | 0.428 |
| FINAL BASELINE | | | | |
| APPLICATION 1 | 0.392 | 0.348 | 0.443 | 0.415 |
| 20 | 0.380 | 0.352 | 0.385 | 0.386 |
| NORMAL COEFFICIENT | 0.370(F) | 0.356(F) | 0.387(F) | 0.363(F) |
| HOT FRICTION COEFFICIENT | 0.393(F) | 0.418(F) | 0.418(F) | 0.415(F) |
| WEAR | | | | |
| WEIGHT LOSS % | 7.4 | 5.8 | 8.6 | 6.6 |
| THICKNESS LOSS % | 5.4 | 3.3 | 5.8 | 2.9 |

As can be noted, formulation no. 9 had good frictional value F-F, acceptable wear rates, and good stable friction throughout the test program. Formulation nos 6, 7 and 8 also had good frictional value of F-F, acceptable wear rates, and relatively stable friction throughout the test program.

EXAMPLE 3

Using the same kind of resin and the same kinds and relative concentrations of additives and fillers as disclosed in the comparison example, six further formulations numbered 10 to 15 respectively, were prepared and processed as previously explained, using FRITMAG instead of asbestos fibers.

In all of these further formulations, the ratio of resin to FRITMAG was kept constant at 0.50. However, the percentage of additives and fillers was varied (0, 15, 20, 50, 60 and 70%, respectively).

The preforming and mechanical properties of the resulting products are given in TABLE IX below:

TABLE IX

Characteristics of the preforming material and the mechanical properties of the example 3.

| COMPOSITION AND PROPERTIES | No FORMULATION | | | | | |
|---|---|---|---|---|---|---|
|  | 10 | 11 | 12 | 13 | 14 | 15 |
|  | RATIO (I/II) | | | | | |
|  | 0.50 | 0.50 | 0.50 | 0.50 | 0.50 | 0.50 |
| 1. COMPOSITION | | | | | | |
| I) Resin (%) | 33.4 | 28.4 | 26.7 | 16.7 | 13.4 | 10.0 |
| II) Fritmag (%) | 66.6 | 56.6 | 53.3 | 33.3 | 26.6 | 20.0 |
| III) Filler (%) | — | 15.0 | 20.0 | 50.0 | 60.0 | 70.0 |
| 2. PREFORMING | | | | | | |
| Ejectability | B | B | B | B | B | B |
| Firmness | B | B | B | B | D | D |
| Hardness "B" scale | 76 | 72 | 70 | 55 | 43 | 33 |
| Bulk factor | 4.2 | 3.8 | 3.9 | 2.9 | — | — |
| Apparent density (g/cc) | 0.46 | 0.52 | 0.52 | 0.65 | 0.69 | 0.88 |
| Flexural strenght (psi) | 36.9 | 26.8 | 23.7 | 8.4 | — | — |
| 3. MOLDABILITY | | | | | | |
| Sticking | A | A | A | A | A | — |
| Blister | A | A | A | A | E | E |
| Flow | B | B | B | C | C | C |
| Density (g/cc) | 1.94 | 1.95 | 2.01 | 1.90 | — | — |
| Water absorption (%) | 0.14 | 0.18 | 0.13 | 0.83 | — | — |
| Flexural strenght (psi) | 13730 | 11775 | 10875 | 7475 | — | — |
| Shear strenght (psi) | 10700 | 8750 | 8725 | 5025 | — | — |

As can be noted, formulation nos 14 and 15 containing 60% or more additives and fillers have proved to be very difficult not to say impossible to mold.

It is therefore obvious that the ratio of the total weight of additives and fillers to the total weight of the composition must be kept lower than 0.60.

The friction characteristics of linings obtained with formulation nos 10 to 13 were measured as explained hereinabove and are reported in TABLE X below:

TABLE X

LINK-CHASE SAE J-661 FRICTION MATERIAL
TEST REPORT FRITMAG FORMULATION (Example 4)

| TEST | FRICTION COEFFICIENT No FORMULATION | | | |
|---|---|---|---|---|
| | 10 | 11 | 12 | 13 |
| INITIAL BASELINE | | | | |
| APPLICATION 1 | 0.347 | 0.312 | 0.261 | 0.446 |
| 20 | 0.358 | 0.308 | 0.297 | 0.467 |
| FIRST FADE | | | | |
| °F. 200 | 0.385 | 0.350 | 0.307 | 0.349 |
| 550 | 0.346 | 0.376 | 0.349 | 0.500 |
| FIRST RECOVERY | | | | |
| °F. 500 | 0.359 | 0.368 | 0.331 | 0.499 |
| 200 | 0.425 | 0.345 | 0.361 | 0.468 |
| WEAR | | | | |
| APPLICATION 1 | 0.455 | 0.387 | 0.326 | 0.433 |
| 100 | 0.418 | 0.395 | 0.451 | 0.387 |
| SECOND FADE | | | | |
| °F. 200 | 0.264 | 0.353 | 0.432 | 0.434 |
| 650 | 0.322 | 0.371 | 0.421 | 0.405 |
| SECOND RECOVERY | | | | |
| °F. 600 | 0.277 | 0.425 | 0.459 | 0.401 |
| 200 | 0.359 | 0.394 | 0.504 | 0.398 |
| FINAL BASELINE | | | | |
| APPLICATION 1 | 0.524 | 0.430 | 0.473 | 0.405 |
| 20 | 0.432 | 0.379 | 0.371 | 0.373 |
| NORMAL COEFFICIENT | 0.376(F) | 0.388(F) | 0.410(F) | 0.384(F) |
| HOT FRICTION COEFFICIENT | 0.332(E) | 0.401(F) | 0.422(F) | 0.380(F) |
| WEAR | | | | |
| WEIGHT LOSS % | 24.2 | 15.4 | 14.9 | 10.0 |
| THICKNESS LOSS % | 21.2 | 12.5 | 12.5 | 10.1 |

EXAMPLE 4

Using the same kind of resin and the same kinds and relative concentration of additives and fillers as disclosed in the comparison example, further formulations numbered 16 to 18 respectively were prepared and processed as previously explained, using FRITMAG instead of asbestos as fibers.

In all of these further formulations, the ratio of resin to FRITMAG was kept equal to 0.60. However the percentage of additives was varied (50, 55 and 60%, respectively).

The preforming and mechanical properties of the resulting products are given in TABLE XI below:

TABLE XI

Characteristics of the preforming material and the mechanical properties of the example 3.

| COMPOSITION AND PROPERTIES | No FORMULATION | | |
|---|---|---|---|
| | 16 | 17 | 18 |
| | RATIO (I/II) | | |
| | 0.60 | 0.60 | 0.60 |
| 1. COMPOSITION | | | |
| I) Resin (%) | 18.8 | 16.9 | 15.0 |
| II) Fritmag (%) | 31.2 | 28.1 | 25.0 |
| III) Filler (%) | 50.0 | 55.0 | 60.0 |
| 2. PREFORMING | | | |
| Ejectability | B | B | B |
| Firmness | C | C | D |
| Hardness "B" scale | 60 | 55 | 35 |
| Bulk factor | 3.1 | 3.5 | — |
| Apparent density (g/cc) | 0.62 | 0.63 | 0.68 |
| Flexural strenght (psi) | 6.0 | — | — |
| 3. MOLDABILITY | | | |
| Sticking | A | A | E |
| Blister | A | A | E |
| Flow | B | B | E |
| Density (g/cc) | 1.91 | 1.84 | — |
| Water absorption (%) | 0.30 | 0.53 | — |
| Flexural strenght (psi) | 6345 | 4785 | — |
| Shear strenght (psi) | 7285 | 7360 | — |

As can be noted, formulations 16 and 17 have shown good preforming properties. Their firmness were given as "fair" (C) and their ejectability and flow were both given as "good" (B). Their flexural strengths were equal to 6345 and 4785 psi, respectively, and their shear strengths to 7285 and 7360 psi respectively.

Formulation no. 18 containing 60% of fillers and additives has proved to be very difficult to mold.

The friction characteristics of the linings obtained with formulation no. 16 were measured as explained hereinabove and are reported in TABLE XII below:

TABLE XII

LINK-CHASE SAE J-661 FRICTION MATERIAL
TEST REPORT FRITMAG FORMULATION (Example 3)

| TEST | FRICTION COEFFICIENT No FORMULATION 16 |
|---|---|
| INITIAL BASELINE | |
| APPLICATION 1 | 0.356 |
| 20 | 0.385 |
| FIRST FADE | |
| °F. 200 | 0.391 |
| 550 | 0.413 |
| FIRST RECOVERY | |
| °F. 500 | 0.437 |
| 200 | 0.382 |
| WEAR | |

TABLE XII-continued

LINK-CHASE SAE J-661 FRICTION MATERIAL
TEST REPORT FRITMAG FORMULATION (Example 3)

| TEST | FRICTION COEFFICIENT No FORMULATION 16 |
|---|---|
| APPLICATION 1 | 0.405 |
| 100 | 0.356 |
| SECOND FADE | |
| °F. 200 | 0.361 |
| 650 | 0.401 |
| SECOND RECOVERY | |
| °F. 600 | 0.403 |
| 200 | 0.365 |
| FINAL BASELINE | |
| APPLICATION 1 | 0.377 |
| 20 | 0.359 |
| NORMAL COEFFICIENT | 0.364(F) |
| HOT FRICTION COEFFICIENT | 0.383(F) |
| WEAR | |
| WEIGHT LOSS % | 5.8 |
| THICKNESS LOSS % | 1.7 |

As can be noted formulation 16 had good frictional value F-F, good wear rates, but friction is a little unstable especially during the wear test.

The embodiments of the invention in which an exclusive property or privilege is claimed are defined as follows:

1. An organic friction material composition comprising:
   a) a fibrous-like synthetic forsterite, hereinafter called FRITMAG, obtained by calcination of chrysotile asbestos fibers at a temperature of from 650° C. to 1450° C. said synthetic forsterite having an MgO: SiO2 ratio lower than 1.1, a raw loose density of from 3 to 40 pcf, a thermal conductivity "k" factor of from 0.25 to 0.40 BTU. in/hr. °F.ft$^2$ and a fusion point of from 1600° to 1700° C.;
   b) a thermosetting resin having heat resistant properties;
   c) at least one friction additive present in such an amount as to adjust the friction and wear properties of the material to some predetermined values, and, if desired,
   d) at least one other additive or filler,
   wherein the weight ratio of said resin to said FRITMAG is ranging between 0.25 and 0.70; and
   wherein the ratio of the total weight of said at least one friction additive and of said at least one other additive or filler to the total weight of the composition is equal to or lower than 0.55.

2. A composition as claimed in claim 1, wherein said weight ratio of said resin to said FRITMAG is ranging between 0.50 and 0.60.

3. A composition as claimed in claim 2, comprising cashew nut shell oil, coal, baryte, calcium carbonate and graphite as said at least one friction additive and said at least one other additive or filler.

4. A composition as claimed in claim 2 for use to manufacture disc-pad brake linings or block or segment linings, wherein said thermosetting resin is a dry resin of the phenolic type.

5. A composition as claimed in claim 2 for use to manufacture roll brake linings, wherein said thermosetting resin is a liquid resin.

6. A composition as claimed in claim 2, wherein said at least one friction additive and said at least one other additive or filler are selected from the group consisting of:
   cashew nut shell powder and oil, copper and brass particles, coal and coal derivatives,
   baryte, calcium carbonate, chromite, iron oxide, natural or synthetic rubber, talc, wollastonite;
   graphite; and
   natural or synthetic organic fibers, mineral fibers and metallic fibers.

7. A composition as claimed in claim 2, wherein said thermosetting resin is selected from the group consisting of phenol-formaldehyde resins, resorcinol-formaldehyde resins, epoxy resins and mixtures thereof.

8. A friction lining obtained by molding a composition as claimed in claim 2.

9. A disc-pad brake lining obtained by dry molding a composition as claimed in claim 4.

10. A block or segment lining obtained by dry molding a composition as claimed in claim 4.

11. A roll-brake lining obtained by wet molding a composition as claimed in claim 5.

* * * * *